United States Patent Office 3,490,236
Patented Jan. 20, 1970

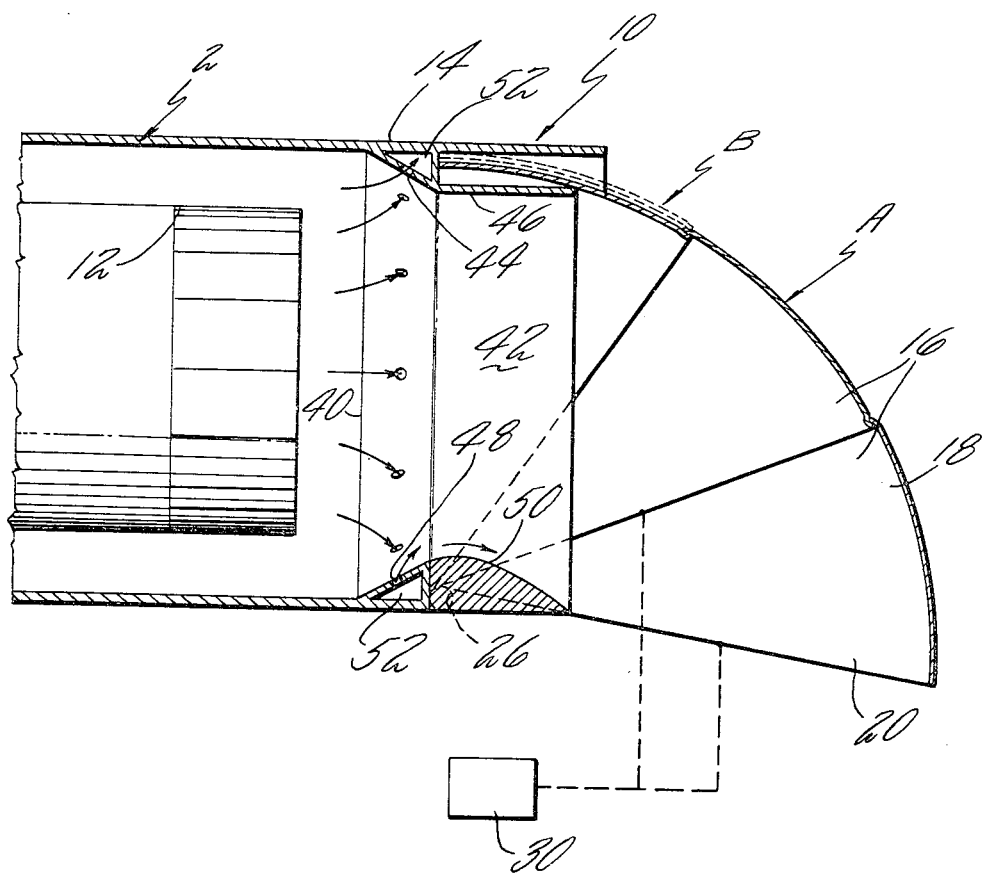

3,490,236
FLOW SEPARATION CONTROL IN AN EXHAUST DEFLECTOR
Stanley J. Markowski, East Hartford, Conn., assignor to United Aircraft Corporation, East Hartford, Conn., a corporation of Delaware
Filed Mar. 21, 1968, Ser. No. 714,865
Int. Cl. B63h *11/10;* F02k *1/22*
U.S. Cl. 60—204                    9 Claims

ABSTRACT OF THE DISCLOSURE

A deflector exhaust construction for a gas turbine engine in which the boundary layer at the inlet to the deflector is controlled to prevent flow separation within the deflector apparatus.

This application is reported as a subject invention under Government Contract AF 33(657)15786.

Background of the invention

This invention relates to a device in an exhaust deflection apparatus for maintaining full flow at the entrance of an exhaust deflection apparatus, thereby eliminating flow separation with the deflection device.

With the advent of vertical take-off and landing aircrafts, the requirement has arisen whereby the exhaust stream of an engine should be directed in a downward direction for at least a part of the flight regime. Several significant problems are encountered in deflecting the normally axial or horizontal flow from a gas turbine engine in a downward direction, these problems being magnified when it is desired to use an afterburner with the engine. Some of the problems encountered in deflecting the stream are the avoidance of engine suppression, maintaining of a high velocity coefficient for the deflected stream, that is, a high efficiency for the deflected stream and minimizing the turning losses. One construction which has avoided some of the foregoing problems is described by the disclosure in U.S. application Ser. No. 545,996 entitled Variable Area Exhaust Deflector by S. J. Markowski filed Apr. 28, 1966.

A second construction which has proven to be successful for deflecting the exhaust stream from a gas turbine engine is a construction described in U.S. application Ser. No. 599,996 entitled Curved Exhaust Deflector by S. J. Markowski filed Dec. 5, 1966, now Patent No. 3,393,516. In both of the foregoing constructions it is necessary from a cooling performance standpoint and an efficiency of deflection standpoint to maintain full flow at the entrance or inlet of the deflection apparatus. This requirement of maintaining full flow at the entrance or inlet of the deflection apparatus was not fully realized, however, upon testing and development of the construction contained in the foregoing applications it was discovered that hot spots would develop on the outer radius of the deflector hood, or alternately the deflection performance or efficiency would be substantially less than that desired. The present invention, by eliminating flow separation at the inlet of the deflector apparatus, avoids the foregoing problems and in fact maintains a high cooling performance and efficiency of deflection.

Summary of the invention

It is a primary object of this invention to provide a deflection configuration which eliminates flow separation at the deflection apparatus inlet and which maintains the required cooling performance and permits a high efficiency of deflection within the deflection apparatus.

In the U.S. application Ser. No. 599,996 entitled Curved Exhaust Deflector by S. J. Markowski filed Dec. 5, 1966, now Patent No. 3,393,516, the characteristics of flow through a curved exhaust deflector were more than amply described and explained, it being pointed out therein that a static pressure differential exists between the outer radius and inner radius diameters of the exhaust deflector duct. The present invention by utilizing this static pressure differential across the deflector passage, that is, the static pressure differential from the outer radius to the inner radius diameter which is established by the basic two dimensional flow properties of a curved or deflected stream, provides a boundary layer control which insures that full flow exists at the entrance to the deflection apparatus.

In an embodiment in which the present invention has particular utility, the horizontal exhaust nozzle to the deflector entrance would be characterized by an expanding section, and by normal linear flow expectations, this diffusion section would cause flow separation. In particular, the separation would occur at the outer radius side of the deflector entrance because the two dimensional flow characteristics in the deflector introduces or superimposes a static pressure differential perturbation into this area which increases the adverse static pressure gradient at the outer radius region of the deflector inlet. This perturbation correspondingly decreases the static pressure and adverse gradient at the inner radius side of the deflector apparatus. The present invention to avoid the adverse effects of flow separation provides an inlet which has at least an opening at the outer radius of the deflector inlet, the purpose of this opening being to bleed off boundary layer air at the outer radius of the deflector inlet. Since the static pressure at the outer radius is greater than the static pressure at the inner radius of the deflector inlet, the inner radius acts as a sink or receptacle for this removed air. The construction of the present invention provides a connection or flow path between the outer radius and inner radius and additionally the inner radius provides a connection or means communicating with the exhaust stream. Hence, the air bled from the outer radius has a positive flow path to a sink at the inner radius and the air led to the sink can be vented to the exhaust stream. By removing the boundary layer air along the outer radius, the deleterious effects of the superimposed adverse static pressure perturbation is ameliorated or removed from the entrance region of the deflector thus eliminating flow separation.

In some configurations it may be necessary that an axial gap exist between the primary exhaust nozzle and the deflector inlet, and if this gap is sufficiently large, flow separation may become established with all of the foregoing adverse effects. To provide for this type configuration a plurality of holes are positioned around the periphery at the deflector entrance. Each of these holes will bleed boundary layer air from the exhaust stream and lead it to a passage which will in turn conduct the bleed air to the inner radius of the deflector thus avoiding this problem. It is pointed out that an inlet with peripheral openings is usable in either of the foregoing configurations.

The present invention by utilizing this boundary layer control has been found to provide a deflection apparatus which substantially maintains its cooling performance and efficiency characteristics to a very high degree.

Brief description of the drawings

The figure is a fragmentary side view of the device of the engine in its intended environment.

Description of the preferred embodiment

Referring now to the single figure, the aft end of a jet engine 2 is illustrated. Although the details of engine 2 are not shown, engine 2 is of a conventional design in which ambient air is drawn into a compressor and delivered in compressed fashion to burner section where heat is added, the air being delivered to a turbine section where work is extracted and then discharged through an exhaust nozzle. Engine 2 may be either a nonafterburning type of engine or an afterburning type, the embodiment herein illustrated being of the nonafterburning type. Although the present invention will be described in an environment which does not include an ejector or a blow-in-door structure, it will be expressly understood that the present invention may incorporate these structures, and in fact, the present invention may be used with any type engine.

Connected downstream of primary exhaust nozzle 12 at the engine housing mount 14 is a plurality of deflector segments 16. Each of the deflector segments 16 is substantially U-shaped and cross sectioned with an arcuate end portion 18 and pie-shaped side segments 20 extending from a pivot 26 to the arcuate end portion 18. The plurality of segments 16 are articulated, and pivot 26 is a common pivot for all of the segments around which the deflector segments rotate. As illustrated in the single figure, the deflected position of segments 16 is indicated by the solid lines designated by the reference character A and the stowed position of the segments 16 is indicated by the dotted line designated by the reference character B. Movement of deflector segment 16 is accomplished by means of any appropriate actuatory system as shown schematically on FIGURE 1 and designated by the numeral 30.

Positioned at the upstream portion of deflection apparatus 10 is inlet 40. Inlet 40 may be of any configuration, but as illustrated herein, it consists of a plurality of openings around the entire periphery of the upstream portion of the deflection entrance 42. A most significant feature of the inlet 40 is the openings 44 at the outer radius diameter 46 of the deflector entrance and the opening 48 at the inner radius diameter 50 of the deflection apparatus. The other openings as indicated by the numeral 52 are necessary when the axial gap between primary exhaust nozzle 12 and inlet 40 is excessive. As has been previously noted hereinbefore, a static pressure differential exists across duct 42, the static pressure along the outer radius of duct 46 being relatively high with respect to the static pressure along the inside radius of duct 50, this static pressure differential contributing significantly to flow separation within the deflecting apparatus by superimposing an adverse static pressure perturbation at the outer radius region of the deflection path because of the two dimensional flow characteristics. The significance of openings 44 and 48 now comes into focus. Since the static pressure is greater at the outer radius boundary layer air for the most part is bled through holes 44 and lead into passage 52, passage 52 extending around the entire periphery of the deflecting apparatus inlet and being in communication with the opening 48 at the inner radius of the duct. Hence, since the static pressure at the outer radius is greater than the static pressure at the inner radius, air is effectively pumped from the outer radius 46 to the inner radius 50 and into the exhaust stream through the cooperation and connection of holes 44, passage 52 and hole 48. It is stressed that the air that is removed is primarily boundary layer air at the outer radius of the duct, and in fact, boundary layer air is removed even when the configuration includes the holes around the periphery of the inlet. It is the removal of this boundary layer air which permits the mainstream to flow through the adverse pressure gradient at the outer radius region of the deflector inlet without flow separation and hence permits the maintenance of the cooling performance and deflection efficiency within the deflection apparatus.

What is claimed is:

1. The method of providing full flow at an inlet to an exhaust deflection device, the deflection device having an outer and inner radius at its inlet region corresponding to to the effective exposed outer and inner flow surfaces of the deflector bend, comprising:
    bleeding air at least at the outer radius of the inlet of the deflector,
    delivering the bleed air from the outer radius to the inner radius of the inlet of the deflector,
    delivering the bleed air from the outer radius to the inner radius,
    reducing the static pressure differential across the deflection apparatus, and
    controlling the amount of bleed air as a function of the static pressure differential across the inlet of the deflection device, air being bled only when there is a static pressure differential between the outer and inner radius of the inlet.

2. The method as recited in claim 1 wherein;
    the bleeding is accomplished by bleeding only boundary layer air from the exhaust stream at the outer radius of the deflector inlet.

3. The method as recited in claim 1 wherein;
    the bleeding is accomplished by bleeding boundary layer air from the exhaust stream around a substantial portion of the periphery of the deflection inlet.

4. A deflection device for a gas stream from an engine having a plurality of deflector segments, the segments being movable between a stored position and a movable position and defining a flow path with a deflected discharge to ambient, wherein the improvement comprises:
    an inlet positioned at the upstream portion of the deflection device, the inlet having bleed means for bleeding air at least at its outer radius, the inlet region outer radius corresponding to the effective exposed outer flow surface of the deflector bend, and a passage for conducting the bleed air to the inner radius of the inlet, the inlet region inner radius corresponding to the effective exposed inner flow surface of the deflector bend, and the inlet inner radius having means communicating simultaneously with the passage and the exhaust stream of the deflection device.

5. A construction as in claim 4 wherein;
    the bleed means at the outer radius of the inlet is at least one opening and the air bled therethrough is primarily boundary layer air from the gas stream, the static pressure of the boundary layer being greater than the static pressure of the boundary layer at the inlet region inner radius; the bleed means, passage and communicating means cooperating and permitting a positive flow from the inlet region outer radius of the deflecting device to the inner radius of the deflecting device and into the gas stream.

6. A construction as in claim 4 wherein;
    the bleed means is a plurality of openings positioned around the periphery of the deflecting device, each of the openings bleeding primarily boundary layer air of a higher static pressure than the static pressure at the inlet region inner radius, and hence insuring a positive flow to the inlet region inner radius of the deflecting device.

7. A gas turbine engine having an engine housing and a primary exhaust nozzle for the engine exhaust stream, a deflection apparatus including:
    a plurality of deflector segments, the segments being movable between a stored position and a deflecting position;
    means for moving the deflector segments to the deflecting position, the deflector segments cooperating in the deflecting position to define a flow path for the engine exhaust stream from the primary nozzle; and
    an inlet positioned at the upstream portion of the deflection device, the inlet having bleed means at least at its outer radius for bleeding air, the inlet outer radius corresponding to the effective exposed outer flow surface of the deflector bend, and a passage for conducting the bleed air to the inner radius of the inlet, the inlet inner radius corresponding to the effective exposed inner flow surface of the deflector bend and the inlet inner radius having means communicating simultaneously with the passage in the exhaust stream of the deflection device.

8. A construction as in claim 7, wherein; the bleed means at the outer radius of the inlet is at least one opening and the air bled therethrough is primarily boundary layer air from the exhaust stream, the static pressure of the boundary layer at the outer radius of the deflection device inlet region being greater than the static pressure of the boundary layer at the inlet region inner radius, the bleed means, passage and communicating means cooperating and permitting a positive flow from the outer radius of the deflecting device to the inner radius of the deflection device and into the exhaust stream in the deflecting apparatus.

9. A construction as in claim 7 wherein; the bleed means is a plurality of openings positioned around the periphery of the deflecting apparatus, each of the openings bleeding primarily boundary layer air from the exhaust stream at a higher static pressure than the static pressure at the inlet region inner radius, and hence insuring a positive flow from the inlet region outer radius to the inlet region inner radius of the deflecting device.

References Cited
UNITED STATES PATENTS

| | | | |
|---|---|---|---|
| 972,437 | 10/1910 | Conner | 285—182 |
| 2,037,940 | 4/1936 | Stalker | 138—39 |
| 2,912,188 | 11/1959 | Singelmann et al. | |
| 3,105,520 | 10/1963 | Lorett et al. | 138—39 |
| 3,216,455 | 11/1965 | Cornell et al. | |
| 3,393,516 | 7/1968 | Markowski | 60—204 |

MARK M. NEWMAN, Primary Examiner

ALLAN D. HERRMANN, Assistant Examiner

U.S. Cl. X.R.

60—232; 239—35; 138—39; 285—182